United States Patent [19]
Crucs

[11] Patent Number: 5,900,883
[45] Date of Patent: May 4, 1999

[54] METHOD FOR STORING AND RETRIEVING A DIGITAL IMAGE ACROSS MULTIPLE STORAGE MEDIA

[76] Inventor: Kevin Crucs, 4671 Ridgewood Rd., Copley, Ohio 44312

[21] Appl. No.: 08/645,578

[22] Filed: May 14, 1996

[51] Int. Cl.⁶ ..................................................... G06T 1/00
[52] U.S. Cl. ........................... 345/435; 345/433; 345/418
[58] Field of Search ........................... 395/118–125, 133, 395/135; 345/418–425, 433, 435

[56] References Cited

U.S. PATENT DOCUMENTS 5,384,785  1/1995  Yoda .......................................... 371/30

*Primary Examiner*—Almis R. Jankus
*Attorney, Agent, or Firm*—Oldham & Oldham Co., L.P.A.

[57] ABSTRACT

A method for storing and retrieving image data across multiple storage media. The method of the present invention allows a large image file to be stored to one or more diskettes, magnetic tapes, fixed disk drives, CD-ROM's, a combination of the foregoing, or any other suitable storage media, without regard to the size of the image data file. When an image file has been stored in accordance with the storage method of the present invention, the file may be easily retrieved from the various storage locations. The image data may be stored such that upon the retrieval thereof, the various storage media utilized may be presented in any order without corruption of the image data. The image data are preferably compressed using any of a wide variety of compression algorithms, and the image may be represented in color, grey tones, or black and white. Also, various error checking algorithms may be utilized in conjunction with the present invention to ensure that all of the data are properly stored and/or retrieved.

32 Claims, 12 Drawing Sheets

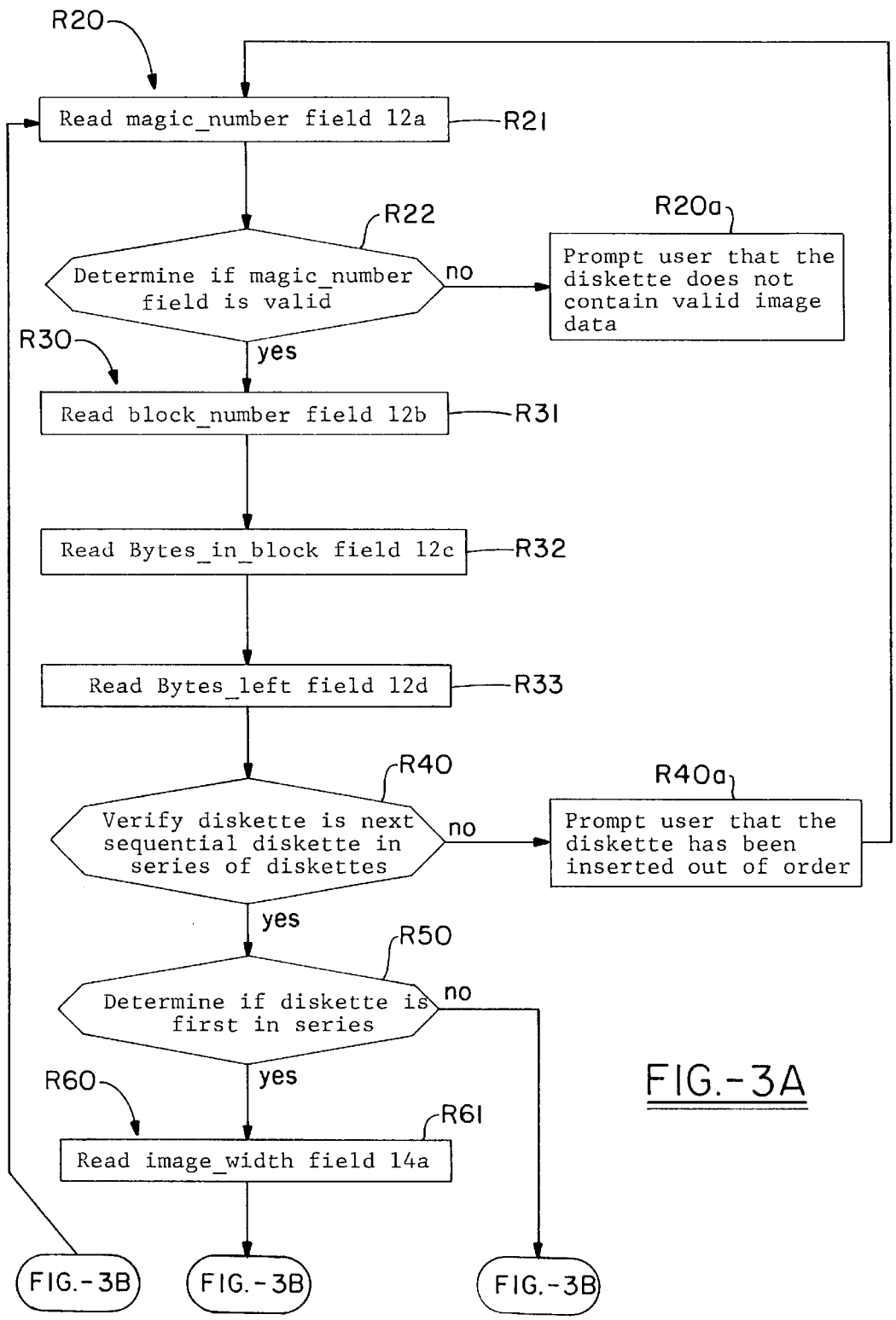

METHOD FOR STORING AND RETRIEVING A DIGITAL IMAGE ACROSS MULTIPLE STORAGE MEDIA

FIELD OF INVENTION

The present invention relates to a method for storing and retrieving image data from a single image across multiple storage media (diskettes or any other media such as multiple CD-ROMs, multiple magnetic tape cartridges or the like).

BACKGROUND OF THE INVENTION

One reason for the ever increasing popularity of computers has been the advances in the quality of the images that may be displayed thereon. The ability to display high quality images has resulted from many different developments in the field of computer science and electronics. More specifically, the availability of low-cost computers having large amounts of dynamic memory, large mass storage devices, high quality/resolution display monitors, and fast central processing units (CPUs) has allowed for the widespread use of computer images having sufficient resolution to be clear and enjoyable to view without requiring an undue amount of computer processing to effect the display thereof. Furthermore, the increased clarity of computer images has allowed doctors, dentists, architects, engineers, and others to utilize computer images in the performance of their respective duties. For example, x-ray data may now be displayed on a computer monitor with sufficient resolution and with all the required colors or shades of grey to allow a doctor or dentist to safely and effectively evaluate medical/dental conditions.

Unfortunately, with the above-noted increased quality of computer images comes a corresponding increase in file size. In most instances, the image data is compressed so that it does not occupy an excessive amount of storage space. However, the more compressed an image file is, the more time and processing power it takes to decompress the file for viewing the image. Also, while "lossy" compression techniques (compression techniques wherein some aspect of the original image data is discarded) allow for faster and increased compression of the data, in certain applications, such as when x-ray images are being used for medical diagnosis, lossy compression techniques and the computer images resulting therefrom, are generally unacceptable. Therefore, an x-ray image, for example, when of a certain high resolution and when represented with a sufficiently "deep" greyscale, may occupy more space than is available on a single piece of storage media such as a single computer diskette.

The increasing size of computer image data files has created a need to provide a method for storing and retrieving image data from a single image to and from multiple storage locations in a simple and effective manner. For example, a first storage medium (diskette, magnetic tape, fixed disk drive) may contain a limited amount of available space which is less than the space needed to store an image. There has been found a need to provide a method for storing a portion of the computer image to the available space on the first storage medium, and to thereafter store the remaining image data to additional storage media (which may be several, and may be the same type or different from the first storage medium). There has likewise been found a need to provide a method for later retrieving data that has been stored "across" multiple storage media in this manner. Furthermore, it would be most desirable to allow the computer image data to be retrieved from the various storage locations without regard to the order in which the retrieval occurs.

Known methods and image file formats do not allow the image data of a single image to be stored on separate pieces of storage media, whether diskettes, floppy diskettes, magnetic tapes, fixed disk drives, or any combination thereof. This results from the fact that the image data is preceded by image "header" information relating to the characteristics of the image that is necessary to properly retrieve the image from its storage location. It can be seen, for example, simply continuing image data from a first diskette to a second diskette causes the image data on the second diskette to become disassociated from necessary header information located on the first diskette, thereby rendering the information on the second diskette irretrievable using conventional techniques.

As is noted above, available fixed disk drives (also referred to as hard disk drives) are capable of storing massive amounts of data, often one to two gigabytes (GB), or more. Therefore, it is a less common occurrence that an image data file will not fit onto the available space of a fixed disk drive. However, when an image data file must be stored to another medium (the previously mentioned diskettes for example) for archival and/or transport of the image data, difficulty arises when the size of the image file exceeds the available amount of space on the medium. For example, it is currently impracticable to transfer large image data files across telephone lines using modem technology due to the relatively low data transfer rates currently available. Therefore, when the transportation of image data is required, the image data is commonly stored on a diskette and the entire diskette is delivered to the image recipient. The recipient may then load the diskette into his or her computer for viewing. Most 3.5 " computer diskettes are currently capable of storing in the range of 1.4 megabytes (MB) of data. Therefore, it can be seen that as the image file size (whether compressed or not) is greater than 1.4 MB, more than one diskette must be utilized to store the image data. For example, a 4 MB image file will require the use of three 1.4 MB diskettes. As noted, known image file formats are incapable of allowing an image file to be stored to or "across" multiple pieces of storage media.

SUMMARY OF THE INVENTION

The present invention is therefore directed to a method for storing and retrieving image data across multiple storage media. The storage method of the present invention allows a large image file to be stored to one or more diskettes, magnetic tapes, fixed disk drives, CD-ROM's, a combination of the foregoing, or any other suitable storage media, without regard to the size of the image data file. When an image file has been stored in accordance with the storage method of the present invention, the file may be easily retrieved from the various storage locations. In a preferred embodiment, the image data are stored such that upon the retrieval thereof, the various storage media utilized may be presented in any order without corruption of the image data. The image data are preferably compressed using any of a wide variety of compression algorithms, and the image may be represented in color, grey tones, or black and white. When a computer operator has a computer image displayed on a computer, or otherwise stored within a computer, the present invention allows the operator to store the image to any available storage medium without fear of running out of storage space. For example, if a single diskette is insufficient to hold the entire image data file, the user will be prompted to insert an additional diskette or will be prompted to otherwise supply the location of an additional suitable storage medium, such as a magnetic tape device or a fixed disk drive. This process will continue until all of the image data has been transferred from within the computer onto the one or more diskettes, magnetic tapes, CD-ROM's, or other storage media. Similarly, to load an image into a computer that has been stored using a method in accordance with the present invention, the operator will insert the diskettes (or provide the other media) as instructed by prompts displayed on the computer display monitor, until all of the image data has been loaded into the computer. Also, various error checking algorithms may be utilized in conjunction with the present invention to ensure that all of the data are properly stored and/or retrieved.

DETAILED DESCRIPTION OF THE INVENTION

The invention will now be described with reference to FIGS. 1A through 8 wherein the preferred embodiments of the invention are shown. As is discussed above, the present invention generally relates to a method of storing digital image data from a single image to multiple storage media as is required to accommodate all of the image data, and also relates to a method of retrieving image data that has been stored to multiple storage media in accordance with the above storing method. A computer image data file may be stored to any suitable media, and any combination of different media. Those skilled in the art will recognize that the method of the present invention may be utilized, for example, to store and retrieve image data from multiple diskettes, multiple fixed disk drives, multiple optical disk drives, multiple magnetic tape storage devices, any combination of the foregoing, and any other suitable storage medium for storing computer data. For clarity, however, the present invention will be described primarily as a method for storing and retrieving image data to and from multiple diskettes as are commonly known, although, of course, the invention is not meant to be limited to the use of diskettes as the storage medium.

Figure 1A:
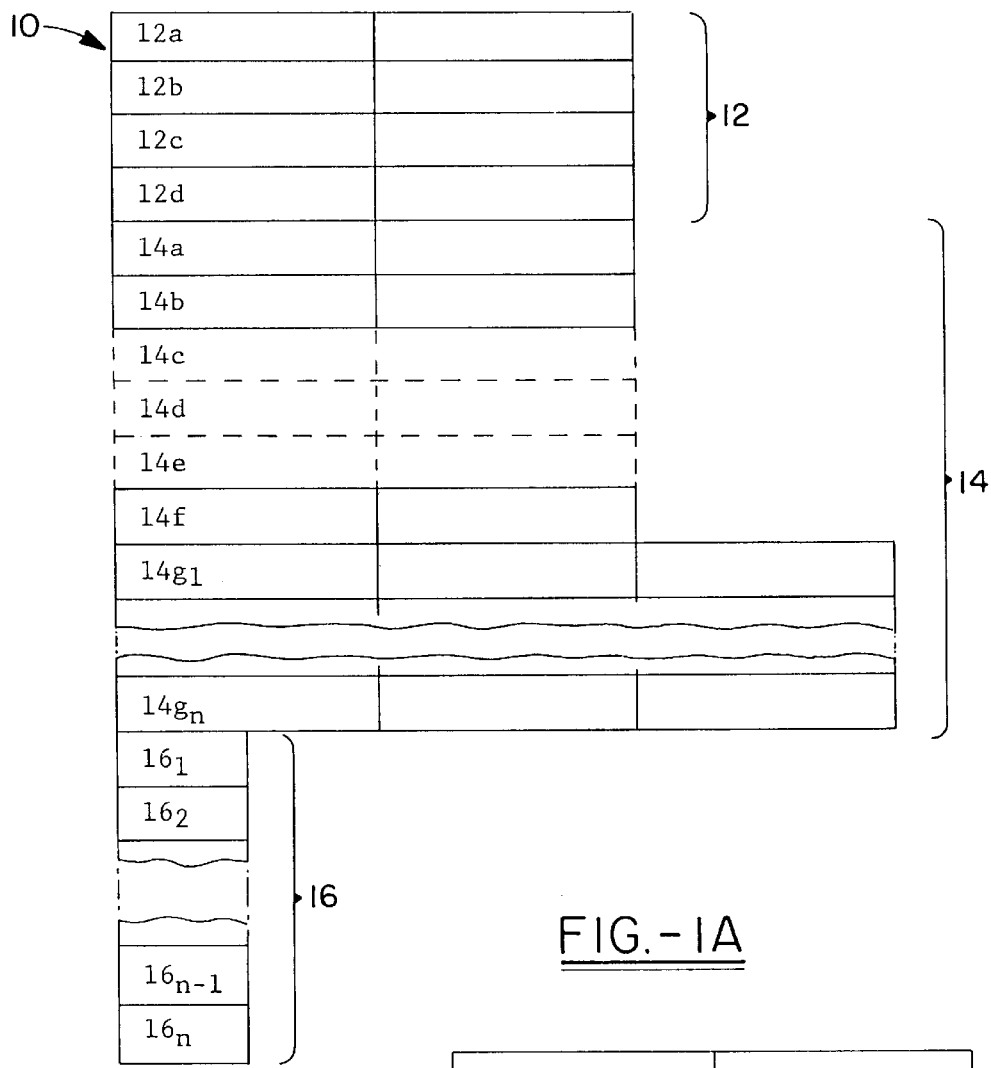
FIGS. 1A and 1B show the data structures created on the storage media when the storage method of the present invention is practiced, and show data structures in conjunction with which the retrieval method of the present invention may be practiced.
Figure 1B:
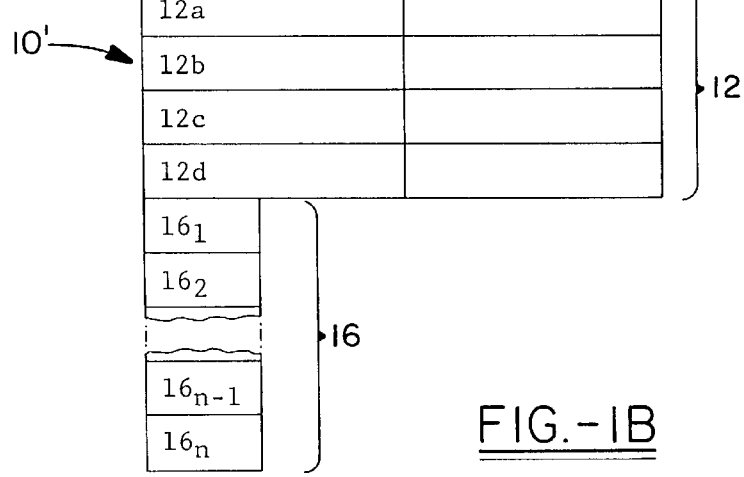

FIGS. 1A and 1B show digital image file data structures that result from practicing a method of storing data in accordance with the present invention, and therefore, also show image data file formats suitable for being accessed in accordance with the method of retrieving data of the present invention. Specifically, FIG. 1A shows a primary block data structure 10 which preferably comprises image block data 12, image information 14, and image pixel data 16. FIG. 1B discloses a secondary block data structure 10' which is preferably similar in all respect to primary structure 10, except for the fact that the image information 14 is omitted. As will be discussed in complete detail below, the method of storing and retrieving data of the present invention results in primary structure 10 being created on the first diskette (or other storage devices/locations) of a series, and results in secondary structure 10' being created on all other diskettes (or other storage devices/locations), if any. An understanding of the data structures 10,10' will facilitate a complete understanding of the method of the present invention.

As is shown in FIGS. 1A and 1B, image block data 12 comprises a magic_number field 12a, a block_number field 12b, a bytes_in_block field 12c, and a bytes_left field 12d. The fields 12a–12d may be any number of bits in length as is required, and as shown herein are 32 bits long. The magic_number field 12a is preferably provided as a storage location for storing a code which indicates that valid image data in the correct format/version is present on the diskette. The block_number field 12b provides the sequential number of the diskette relative to the other diskettes in a series thereof that each partially contain data of the same image. The bytes_in_block field 12c contains the number of bytes of image pixel data 16 stored on the current diskette, and the bytes_left field 12d contains the number of bytes of image pixel data 16 that follow on subsequent diskettes.

Image information 14 preferably comprises at least an image_width field 14a, and image_height field 14b, an image_colors field 14f, and a plurality of image_palette fields $14g_1$–$14g_n$. The image_width and image_height fields 14a,14b respectively contain the width of the stored image and the height of the stored image, both expressed in terms of number of pixels. The image_colors field 14f is used to specify the number of image_palette fields $14g_1$–$14g_n$ that are present in the data structure 10—i.e., the image_colors field 14f sets forth the size of the image palette. The image_palette fields $14g_1$–$14g_n$ contain the specific red, green, blue (RGB) pixel values for each color or tone of grey represented by the image pixel data 16. Anywhere from a single image_palette field $14g_1$–$14g_n$ to millions of image_palette fields $14g_1$–$14g_n$ may be defined. Also, as is represented in broken lines, image information 14 may comprise numerous other fields such as, for example, vertical_resolution and horizontal_resolution fields 14c, 14d which respectively specify the vertical and horizontal image resolution in terms of "dots per inch" such that the dimensions of a displayed object may be calculated. Also, one or more reserve fields 14e may be provided to allow for the subsequent insertion of additional image information fields as desired.

Finally, as shown in FIGS. 1A and 1B, image pixel data 16 comprises a plurality of image_pixel_data fields $16_1$–$16_n$, each of which contain a value that references a specific image_palette field $14g_1$–$14g_n$ such that the RGB value referenced may be displayed for each pixel of the stored image. As an alternative to providing image_palette fields $14g_1$–$14g_n$, each image_pixel_data field $16_1$–$16n$ may itself contain a specific RGB value, although such an arrangement requires more storage space due to the duplication of the RGB combinations.

Figure 2:
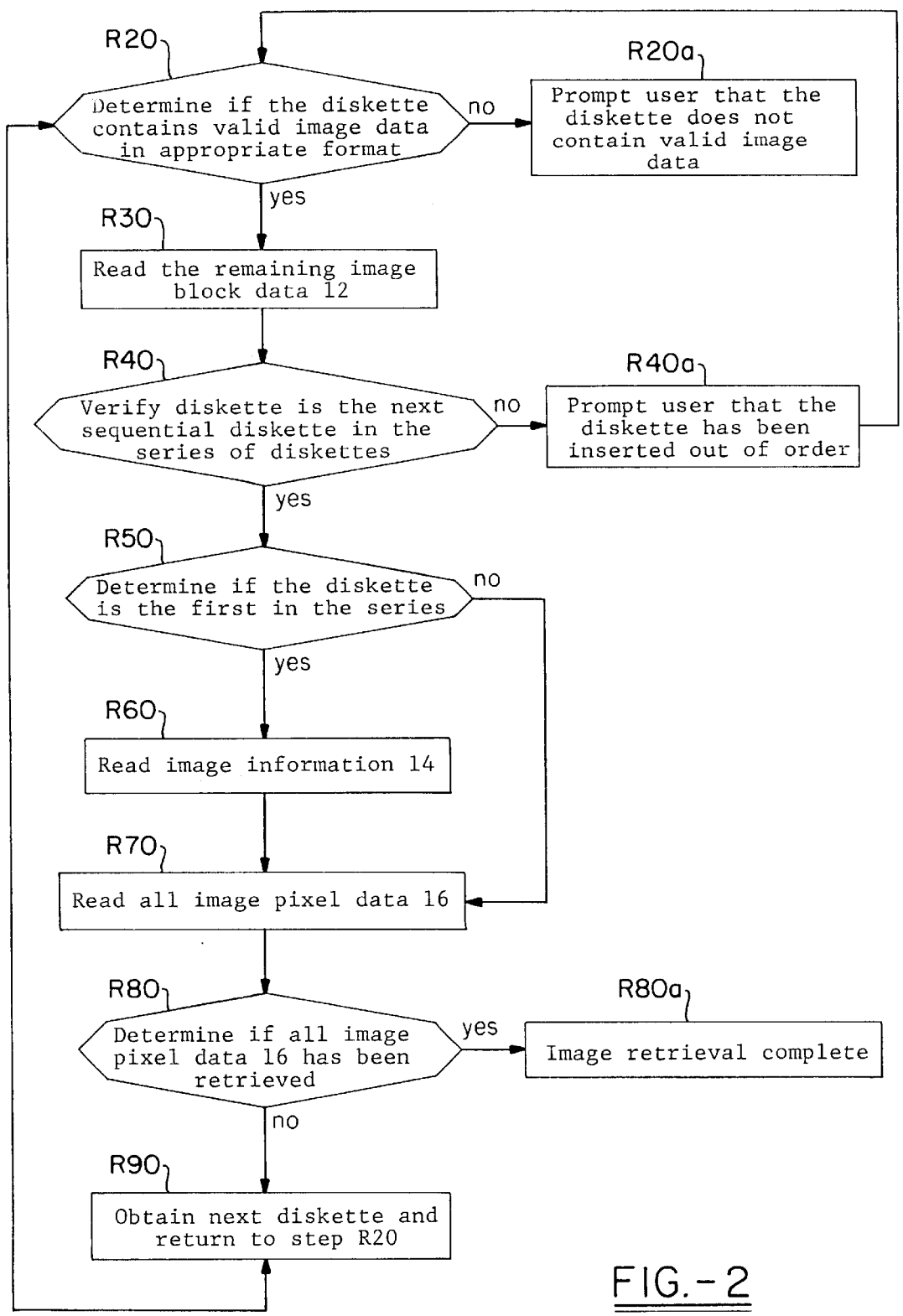
FIG. 2 is a flow chart that generally presents a retrieval method in accordance with the present invention.

FIG. 2 generally sets forth a method of retrieving image data from multiple storage media in accordance with the present invention. Each step will be explained in further detail hereinafter with reference to FIG. 3. To retrieve the image pixel data 16 from a plurality of diskettes, an operator of a computer will sequentially insert the diskettes into a disk drive of the computer such that the information can be retrieved from the diskettes in accordance with the following process. Specifically, FIG. 2 shows the steps R20–R90, wherein step R20 comprises the step of "Determining if the diskette contains valid image data in the appropriate format." If not, step R20a—"Prompt the user that the diskette does not contain valid image data" is performed. If the diskette contains the appropriate data, step R30—"Read the remaining image block data 12" is performed. Step R40 "Verify diskette is the next sequential diskette in the series of diskettes" is performed. If the user has inserted a diskette in to the computer out-of-order, step R40a—"Prompt user that the diskette has been inserted out-of-order" is performed. Otherwise, step R50 is performed to "Determine if diskette is first in a series" (or the only diskette used). If the diskette is the first diskette in a series or is the only diskette used to store the image data, step R60 is performed to "Read image information 14." After step R60, or if the diskette is not the first diskette, steps R70 "Read all image pixel data 16 on diskette" and R80 "Determine if all image data 16 has been retrieved" are performed. If all of the image pixel data 16 from the various diskettes has been read, the retrieval process is terminated (step R80a) otherwise, if image data has yet to be retrieved from other diskettes, step R90 "Obtain next diskette and return to step R20" is performed. The process is repeated beginning with step R20 for each additional diskette inserted into the computer by the user thereof.

Figure 3B:
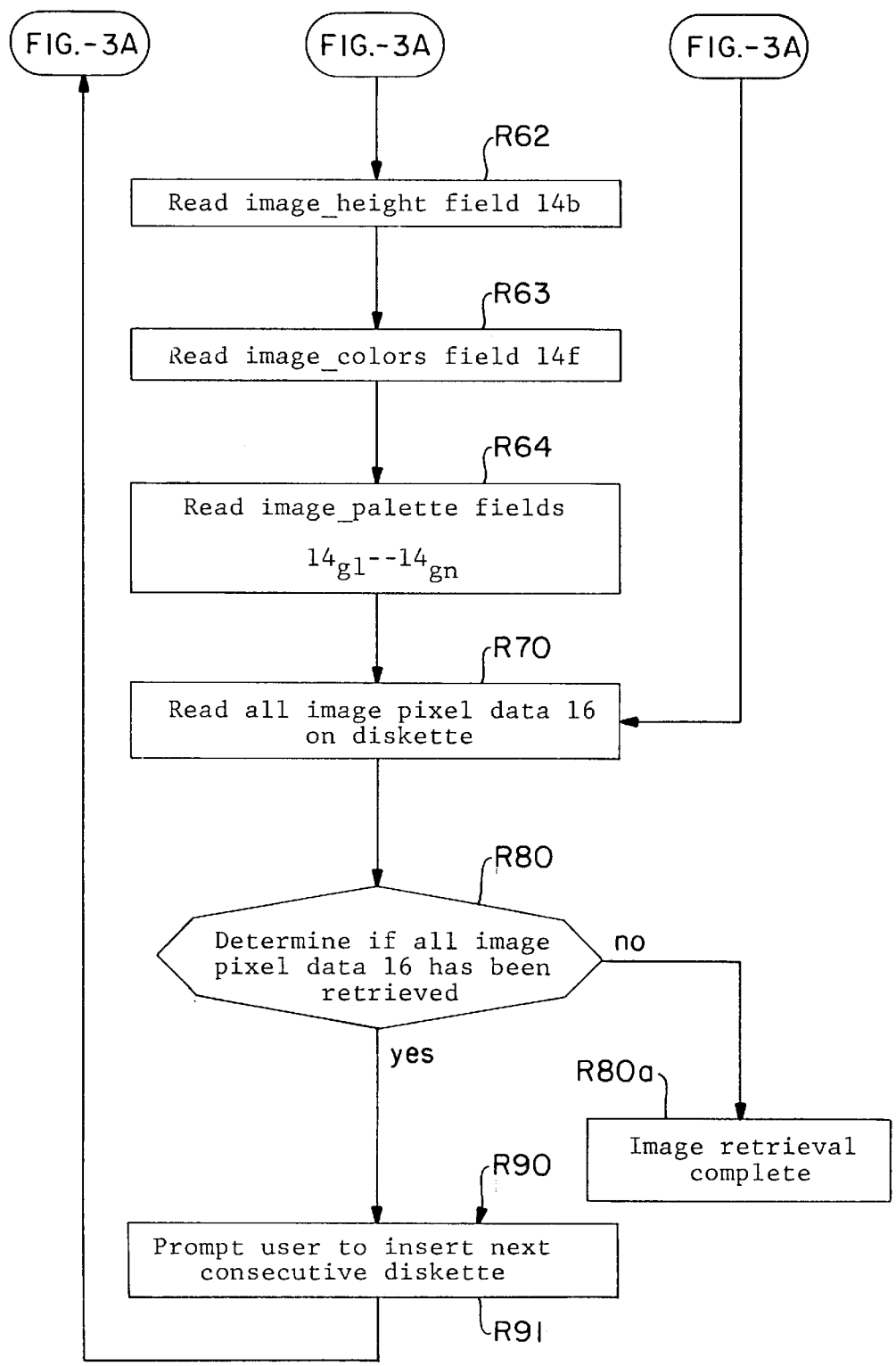
FIG. 3 (comprising FIGS. 3a and 3b) is a flow chart that present the retrieval method of FIG. 2 in greater detail.

FIG. 3 sets forth in further detail the steps R20–R90 of FIG. 2, with particular reference to the data structures 10 and 10' shown in FIGS. 1A and 1B, respectively. Step R20 comprises the substeps R21 "Read magic_number field 12a" and R22 "Determine if magic number is valid." Step R20a, "Prompt the user that the diskette does not contain valid image data", is performed if a correct magic number is not found at the beginning of the file data structure 10,10'. The general step R30 is accomplished through substeps R31, R32, R33—"Read block_number field 12b", "Read bytes_in_block field 12c", and "Read bytes_left field 12d", respectively.

Step R40 "Verify diskette is the next sequential diskette in the series of diskettes" is performed by examining the value obtained from the block_number field 12b and comparing the value to a counter variable that keeps track of the number of diskettes previously read, such that the next diskette of the sequence can be determined. Therefore, for example, if an image is stored on four diskettes, the first diskette in the series of four has a value of 1 stored in the block_number field 12b, with diskettes 2–4 respectively having the value of 2, 3, or 4 stored in the block_number field 12b. If the diskette inserted by the user is not the next sequential diskette, step R40a is performed to "Prompt user that the disk has been inserted out-of-order." If the block_number field 12b contains the correct sequential value, step R50 is performed to determine if the block_number field 12b contains the value 1 (indicating that the diskette is the first and/or only diskette containing image pixel data 16). If the block_number field 12b does not contain the value 1, the retrieval process skips to step R70. Otherwise, step R60 "Read image information 14" is performed by steps R61 "Read image_width field 14a", R62 "Read image_height field 14b", R63 "Read image_colors field 14f", and R64 "Read image_palette fields $14g_{1_1}$–$14g_n$".

After step R60 (or after step R50 if the block_number field 12b did not contain the value one), step R70 "Read all image pixel data 16 on diskette" is performed to read every image pixel data field $16_1$–$16n$ on the current diskette. Step R70 may be performed by utilizing the value obtained from the bytes_in_block field 12c which specifies the number of image_pixel_data fields $16_1$–$16n$ that must be read to retrieve all image pixel data 16 on the present diskette. Step R80 "Determine if all image pixel data 16 has been retrieved" is performed by examining the value read from the bytes_left field 12d, which specifies the number of bytes of image pixel data 16 yet to be retrieved from subsequent diskettes, and comparing the value specified therein with 0. If the value of bytes_left>0, then step R90 "Obtain next diskette and return to step R20" is performed for example through substep R91 "Prompt the user to insert the next consecutive diskette." If the value of bytes_left=0, then all image pixel data 16 has been retrieved from its various diskettes and other locations and the retrieval process is complete.

Figure 4:
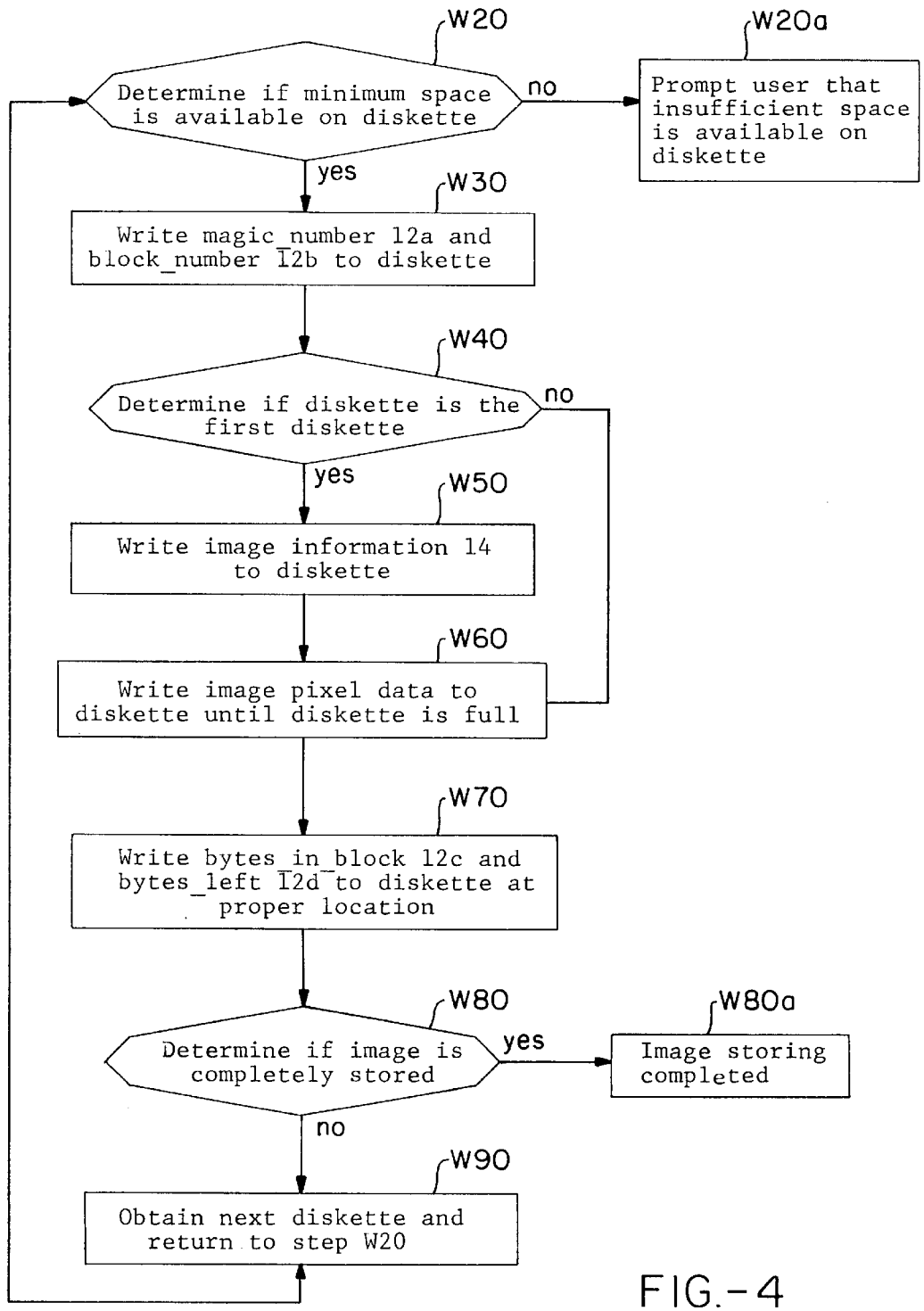
FIG. 4 is a flow chart that generally presents a storage method in accordance with the present invention.

FIG. 4 generally sets forth a method of storing image data to multiple storage media in accordance with the present invention. Each step will be explained in further detail hereinafter with reference to FIG. 5. In general, and with reference to the use of a plurality of diskettes to store the image data, the following storage process requires an operator of a computer to insert as many diskettes as required sequentially into a disk drive of a computer such that the image can be stored on the various diskettes. Specifically, FIG. 4 shows steps W20–W90 wherein step W20 "Determine if minimum space available on the diskette" is performed initially to determine if a meaningful amount of space is available on the diskette. Of course, there need not be sufficient available space to store the complete image, but there must be sufficient available space to store the image block data 12, the image information 14 (if the disk is the first diskette), and at least one field of image pixel data 16, although preferably, the diskette will contain available space for a larger amount of image pixel data 16—e.g., at least 1 kilobyte (KB). The method of the present invention does not require that the diskette(s) be free of other files. If there is not sufficient available space on a diskette that has been inserted by an operator of the computer, step W20a, "Prompt user that insufficient space available on the diskette" is performed.

Once an acceptable diskette has been inserted by a user, step W30, "Write magic_number 12a and block_number 12b to diskette" will be performed. As discussed previously, magic_number 12a is simply a special code to identify the following information on the diskette as image data in a format that is compatible with the method of the present invention. Block_number 12b is simply the sequential number of the diskette relative to previous diskettes to which data from the same image have been written. Step W40, "Determine if diskette is first diskette" will then be performed. If the diskette is the first diskette written to, then step W50, "Write image information 14" must be performed. After step W50, or if the diskette is not the first diskette written to, step W60 will be performed to "Write image pixel data 16 to diskette until diskette is full." As the image_pixel_data fields $16_1$–$16_n$, are being written to the diskette in step W60, the amount of data written is being tabulated such that step W70 can be performed to "Write bytes_in_block field 12c and bytes_left 12d to diskette at proper location." Bytes_in_block 12c is the number of bytes of image_pixel_data $16_1$–$16_n$ that have been written to the diskette, while bytes_left is a record of the number of bytes of image pixel data that have not yet been stored to a diskette. Bytes_left can be calculated by determining the total size of the image (simply the width*height) in bytes and subtracting the number of bytes that have heretofore been stored on all diskettes.

Step W80 is performed to "Determine if image has been completely stored." This is performed by examining the value stored in the bytes_left field 12*d*. If there are no bytes left, then the storing process is complete as indicated by step W80*a*. If there are bytes left, then step W90 will be performed to "Obtain the next diskette and return to step W20", normally by prompting the machine operator.

Figure 5A:
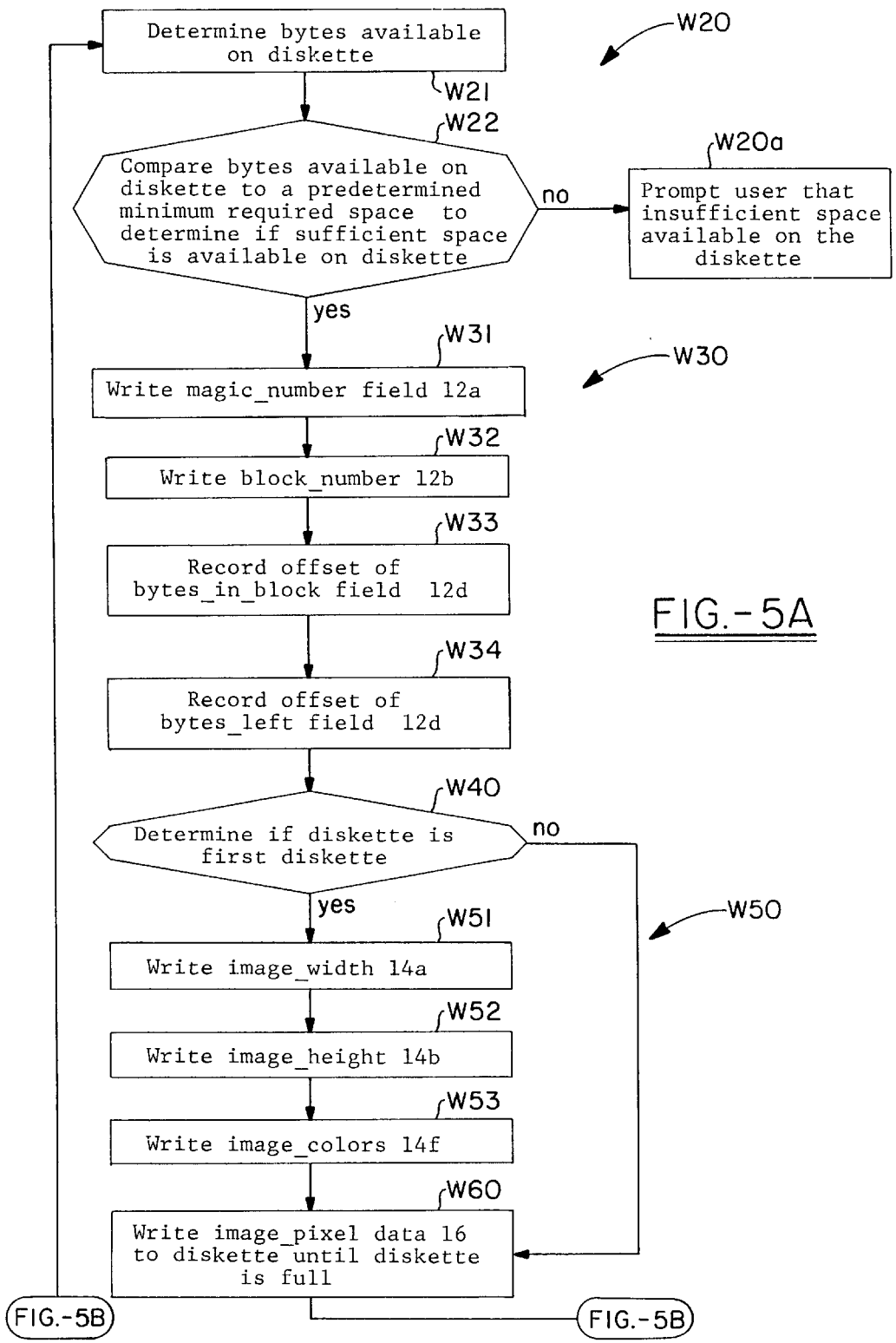
FIG. 5 (comprising FIGS. 5a and 5b) present the storage method of FIG. 4 in greater detail.
Figure 5B:
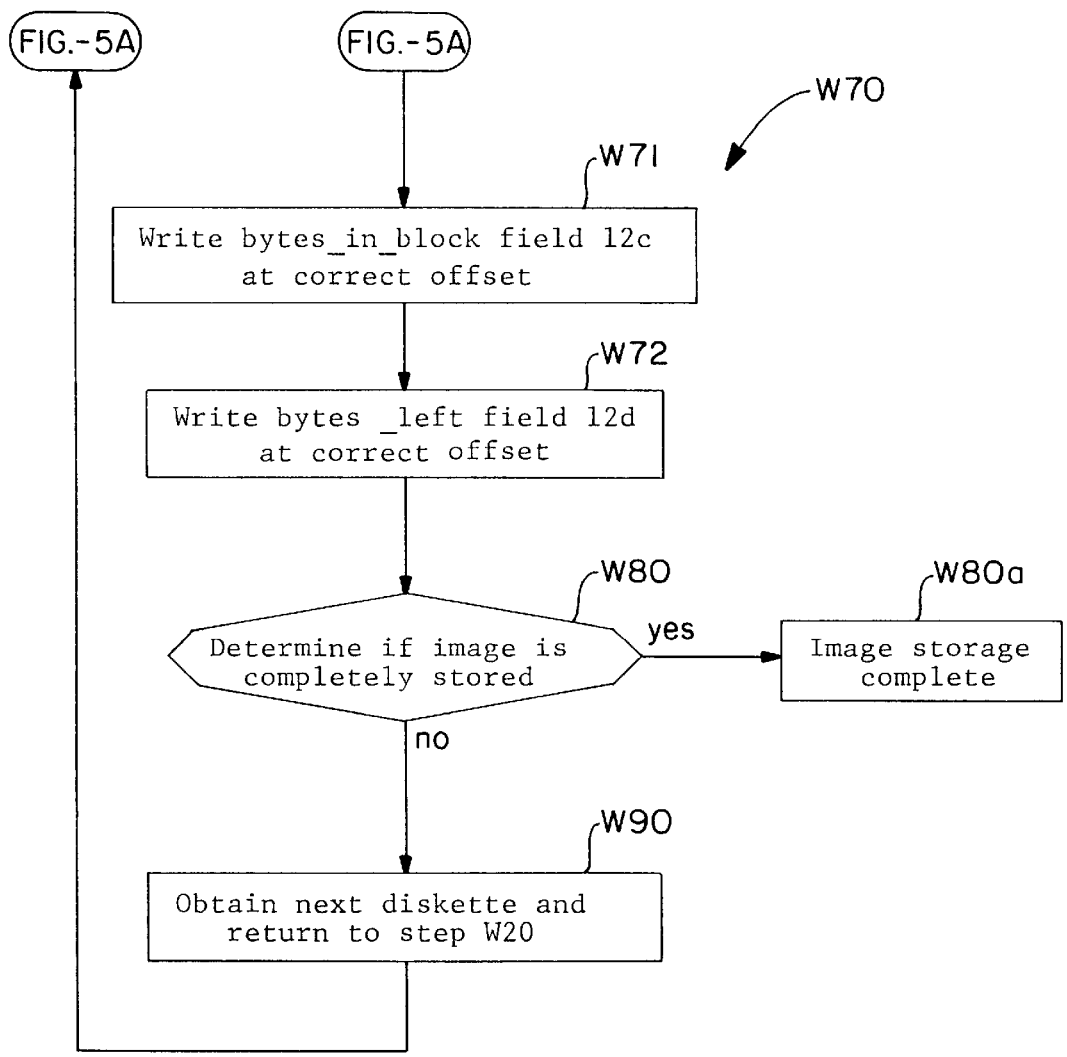

FIG. 5 provides further details with respect to the steps W20–W90 of FIG. 4. Step W20 is performed by substep W21, "Determine bytes available on the diskette" and substep W22 "Compare bytes available on diskette to a predetermined minimum required space to determine if sufficient space is available on diskette." If the minimum space is not available, step W20*a* "Prompt user that insufficient space available on diskette" is performed to inform the computer operator to insert a new diskette. If sufficient space is available on the diskette, step W30 is performed through substeps W31–W34. Step W31, "Write magic_number 12*a*" is performed by writing a predetermined magic number value in the magic_number field 12*a* and step W32, "Write block_number 12*b*" is performed by writing the sequential number of the current diskette in the block_number field 12*b*. In order to perform step W70 at a later time, step W30 also comprises the substep W33, "Record offset of bytes_in_block field 12*c* and step W34, "Record offset of bytes_left field 12*d*". The offset of a field is its position relative to a known starting point such as field 12*a*. Those skilled in the art will recognize that these fields 12*c* and 12*d* can be located at a later time for the performance of step W70 if their position relative to the first field 12*a* is known.

Step W40, "Determine if diskette is first diskette" is performed to determine if the current diskette is the first to which image data has been stored. This is determined by keeping a variable that is incremented each time a new disk is written to. If the current diskette is the first for a particular image, step W50 must be performed by substeps W51–W54. Step W51, "Write image_width 14*a*" is carried out by examining the width of the image in number of pixels and storing that value in the image_width field 14*a*. Likewise, step W52, "Write image_height 14*b*" is carried out by e examining the height of the image in number of pixels and storing that value in the image_height field 14*b*. Step W53, "Write image_colors 14*f*" is carried out by storing in the image_colors field 14*f* the number of RGB values stored in the image_palette fields $14g_1$–$14g_n$ (this value is the number of different colors and/or grey tones found in the image pixel data 16).

With the image information 14 completely written to the diskette, or if the diskette is not the first diskette written to, step W60, "Write image pixel data 16 until diskette is full" is performed. This step is carried out by obtaining the particular image pixel data from the memory of the computer on which the image is displayed or stored, and writing the same to the image_pixel_data fields $16_1$–$16_n$ of the diskette. When the diskette is full (or if the image has been completely stored), step W70 is performed through substep W71, "Write bytes_in_block field 12*c* at correct offset" and substep W72, "Write bytes_left field 12*d* at correct offset" as is discussed above.

Step W80 is carried out by comparing the value stored to the bytes_left field to 0 to determine if additional diskettes are required to store further image pixel data 16, or if the storing process is complete. If the value within the bytes_left field 12*d*=0, the image storing process is complete, while if the value within the bytes_left field 12*d*> 0, step W90, "Obtain next diskette and return to step W20" is performed, otherwise, the image has been completely stored as indicated by step W80*a*.

It can be seen from the foregoing that the present invention describes a method for storing and retrieving the data of a single image to and from multiple diskettes. As was stated previously, and as will be recognized by those skilled in the art, the method of the present invention can be utilized with any type of storage medium, and any combination thereof. Therefore, while the method has been described with particular reference to the use of diskettes, the method may be practiced with hard or "fixed" disk drives, magnetic tapes, CD-ROM's, and any other suitable storage media. It can be seen from the foregoing that when a computer operator has a computer image displayed on a computer, or otherwise stored within a computer, the method of the present invention allows the operator to store the image without fear of running out of storage space. If a single diskette is insufficient to hold the entire image, the user will be prompted to insert an additional diskette or will be prompted to otherwise supply an additional suitable storage medium, such as a magnetic tape or a fixed disk drive. This process will continue until all of the image data has been transferred from the computer memory onto the one or more diskettes, magnetic tapes, CD-ROM's, other storage media, or combination thereof. Similarly, to load an image into a computer that has been stored using a method in accordance with the present invention, the operator will insert the diskettes (or other media) sequentially, as instructed by prompts displayed on the computer display monitor, until all of the image data has been loaded into the computer. Finally, those skilled in the art will recognize that a wide variety of data compression techniques may be utilized in conjunction with the foregoing method of the present invention, and it is preferable that a data compression technique such as Run Length Encoding (RLE), LZ compression, or any other suitable compression technique be so utilized, and also that a wide variety of error checking operations may be performed in conjunction with the foregoing methods to ensure that the image is accurately stored to the storage media, and accurately retrieved therefrom.

FIGS. 6A through 8 present an alternative embodiment of a method in accordance with the present invention. A limitation associated with the method as is set forth above in conjunction with FIGS. 1A through 5, is that, in order for the image data to be retrieved from the various diskettes, the operator of the computer must present the diskettes in sequential order, beginning with the first diskette to which data were written, and ending with the last. While this is generally not difficult, the embodiment of the present invention presented below in conjunction with FIGS. 6A through 8, provides a method of storing image data to diskettes (or another media) and reading data therefrom, that does not require the diskettes to be read in the order they were written.

Figure 6A:
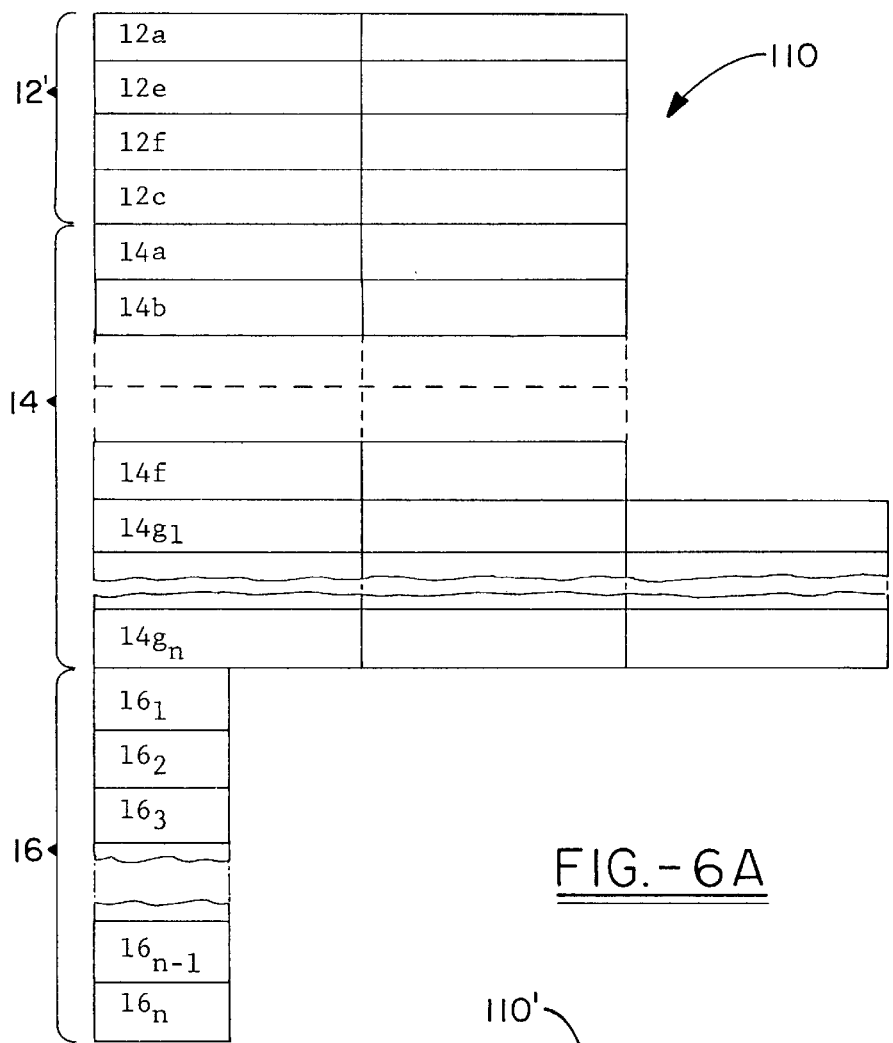
FIGS. 6A and 6B show the data structures created on the storage media when an alternative storage method in accordance with the present invention is practiced, and show data structures in conjunction with which an alternative retrieval method in accordance with the present invention may be practiced.
Figure 6B:
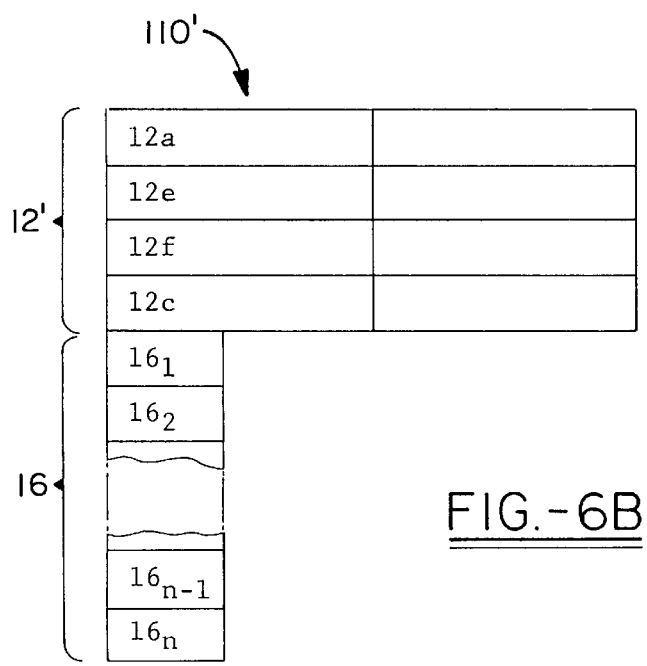

Similar to that shown in FIGS. 1A and 1B, FIGS. 6A and 6B show digital image file data structures that result on the storage media from practicing the following alternative embodiment of the present invention. Specifically, FIG. 6A shows a primary block data structure 110 that is similar in all respects to that shown in FIG. 1A, except that the block_number field 12*b* and the bytes_left field 12*d* have been eliminated from the image block data 12, and a total_ image_size field 12e and an offset field 12f have been added thereto to form image block data 12'.

In a manner similar to that discussed with respect to FIG. 1B, secondary block data structure 110' comprises image block data 12' and image_pixel_data 16. Primary block data structure 110 is created on only the first diskette of a series to which data are written, and secondary block data structure 110' is written to the subsequent diskettes to which image data are written, if any.

Figure 7A:
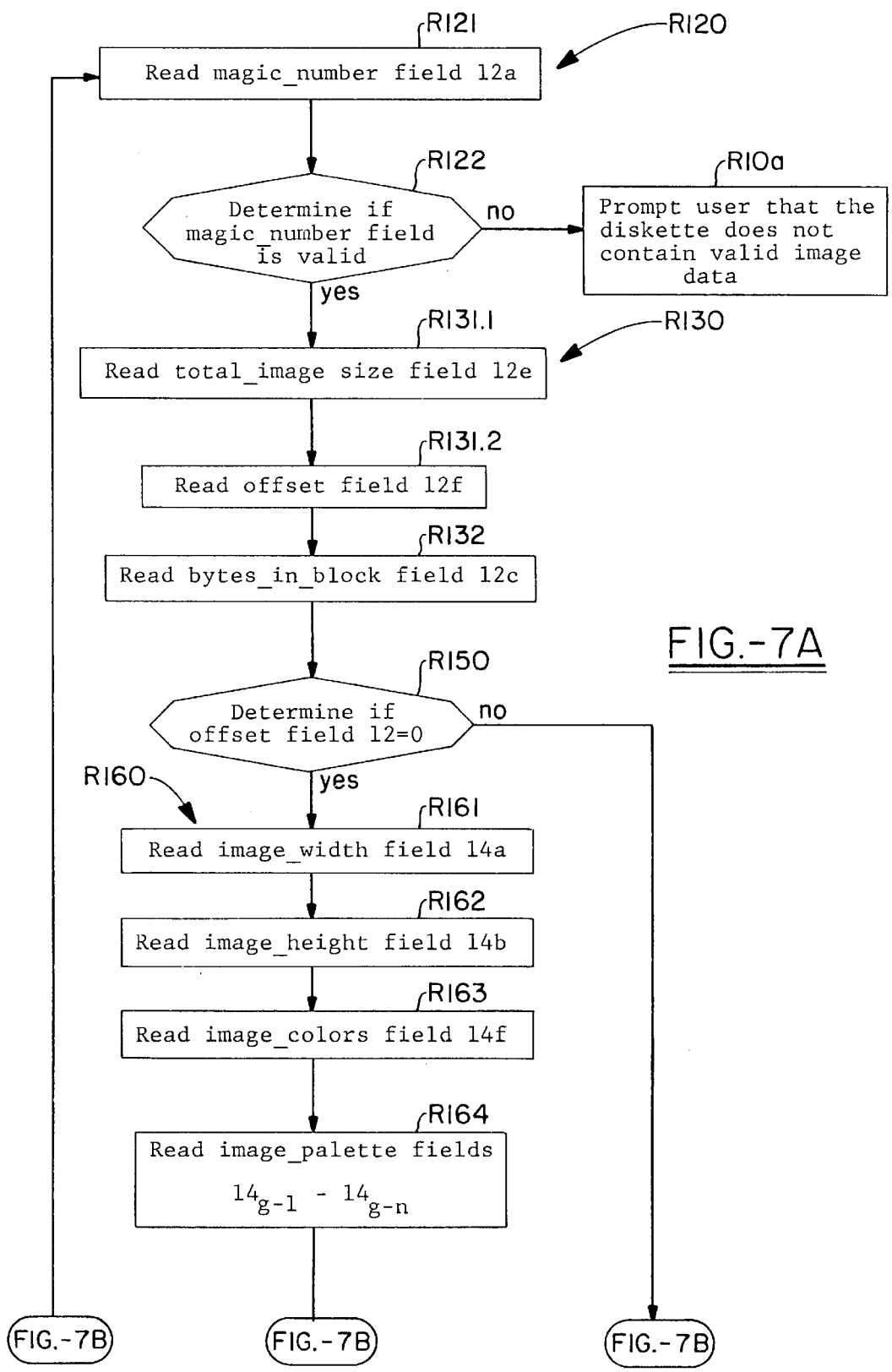
FIG. 7 (comprising FIGS. 7a and 7b) is a flow chart setting forth the steps of a retrieval method in accordance with an alternative embodiment of the present invention; and, FIG. 8 (comprising FIGS. 8a and 8b) is a flow chart setting forth the steps of a storage method in accordance with an alternative embodiment of the present invention.
Figure 7B:
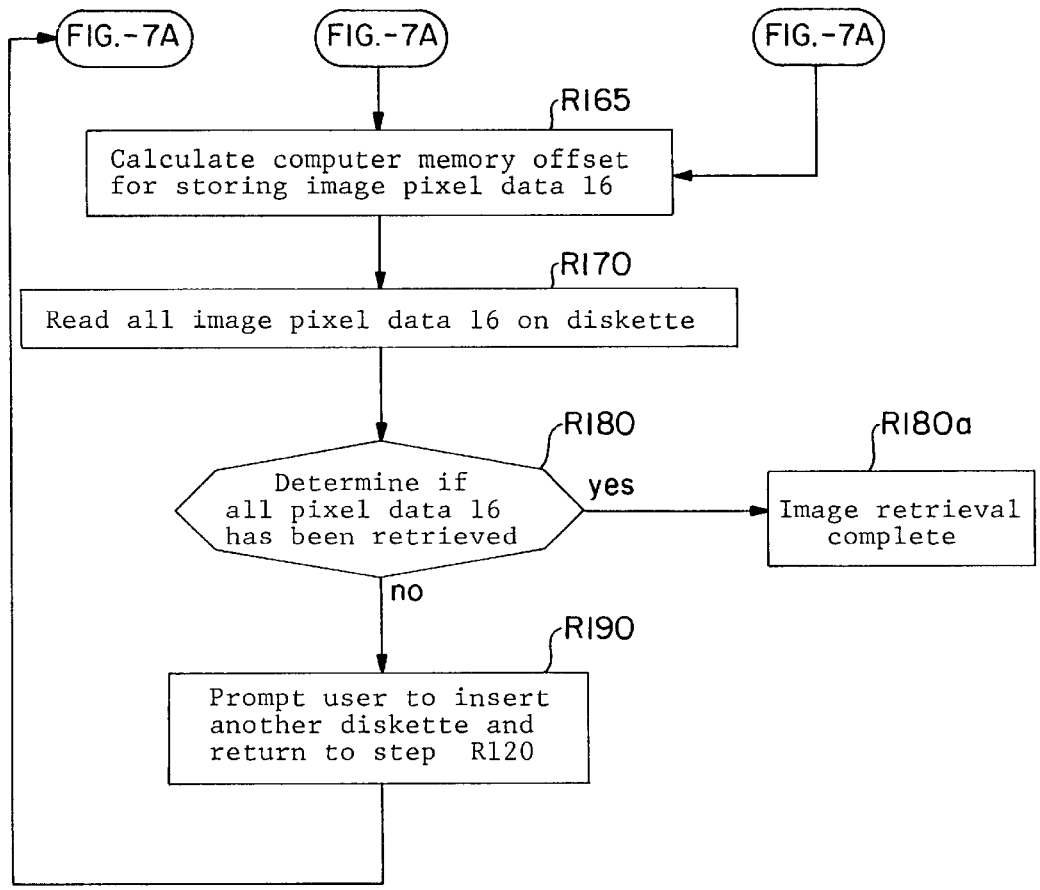

With reference also to FIG. 7, a method of retrieving image data from several diskettes or other storage media is set forth. Steps corresponding to steps discussed in relation to FIGS. 1A through 5 have been numbered 100 greater than the steps to which they correspond. When a computer user has inserted a diskette into the computer disk drive or has otherwise made the storage media available for reading by the computer, the computer verifies that the diskette includes thereon a valid image data file in the correct file format/version by performing steps R121, "Read magic_number field 12a" and R122 "Determine if the magic number is valid." If the magic number is invalid, step R120a is performed to "Prompt user that the diskette does not contain valid image data." If the magic number is valid, step R130 is performed to obtain the remaining image block data 12'. Specifically, substep R131.1, "Read total_image_size field 12e" is performed to obtain the total size of the image to be retrieved. This allows the proper amount of computer memory to be allocated for the placement of the retrieved image pixel data 16. Substep R131.2, "Read offset field 12f" is performed to obtain the offset, relative to the beginning of the allocated memory, where the retrieved image pixel data 16 on the current diskette are to be located. Substep R132, "Read bytes_in_block field 12c" is performed so that amount of image_pixel_data on the current diskette is known.

Step R150, "Determine if offset field 12f=0" is performed to determine if the diskette is the first diskette to which data were written. If the offset field 12f=0, it can be seen that the image pixel data 16 on the current diskette will be located at the very beginning of the allocated computer memory when retrieved. When the offset=0, the diskette contains the primary block data structure 110, and it is therefore necessary to perform step R160. Step R160, "Read image information 14" is performed through substeps R161–R164 which correspond to substeps R61–R64 discussed in relation to FIG. 3.

After step R160, or if the offset field 12f is not equal to 0, step R165, "Calculate computer memory offset for storing image pixel data 16" is performed. This step determines the exact offset within the allocated memory where the retrieved image pixel data 16 is to be located—i.e., the starting memory address plus the offset 12f. Once the computer memory offset is calculated, step R170 is performed to "Read all image pixel data 16" on the current diskette. Step R180 is then carried out to determine if the image has been completely retrieved from the various diskettes or other media. This can be carried out, for example, by keeping a running total of the bytes retrieved, and comparing the total to the value in the total_image_size field 12e. If the image has been completely retrieved, the process is complete as indicated at step R180a. If not, step R190 is performed to "Prompt user to insert another diskette and return to step R120" whereby the process is repeated until the image has been completely retrieved.

It can be seen that this method of retrieving image data does not require the diskettes to be inserted in order, because, if inserted out of order, the image pixel data 16 will nonetheless be stored in the appropriate location of allocated computer memory based upon its offset relative to the beginning of the image pixel data 16.

Figure 8A:
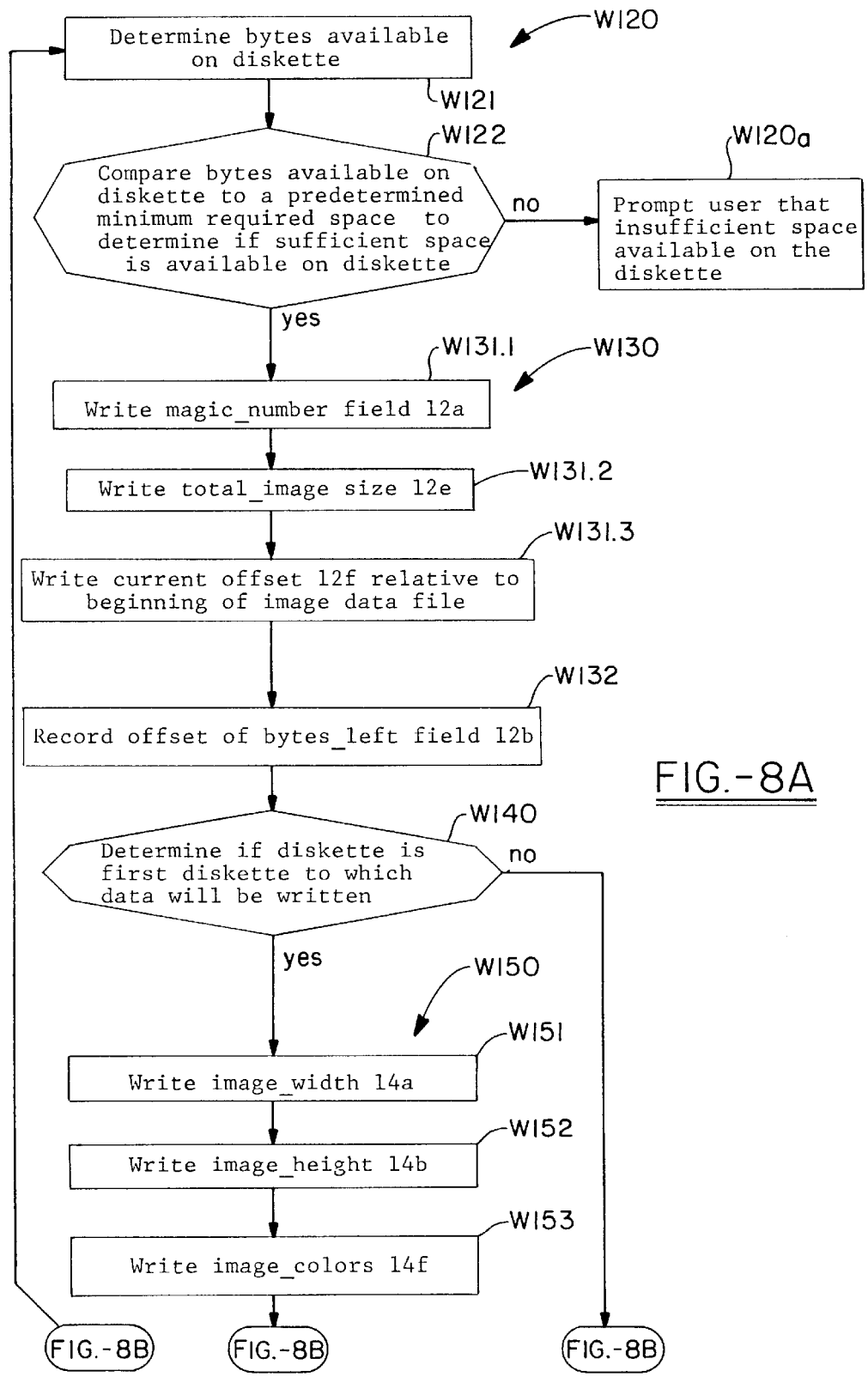
Figure 8B:
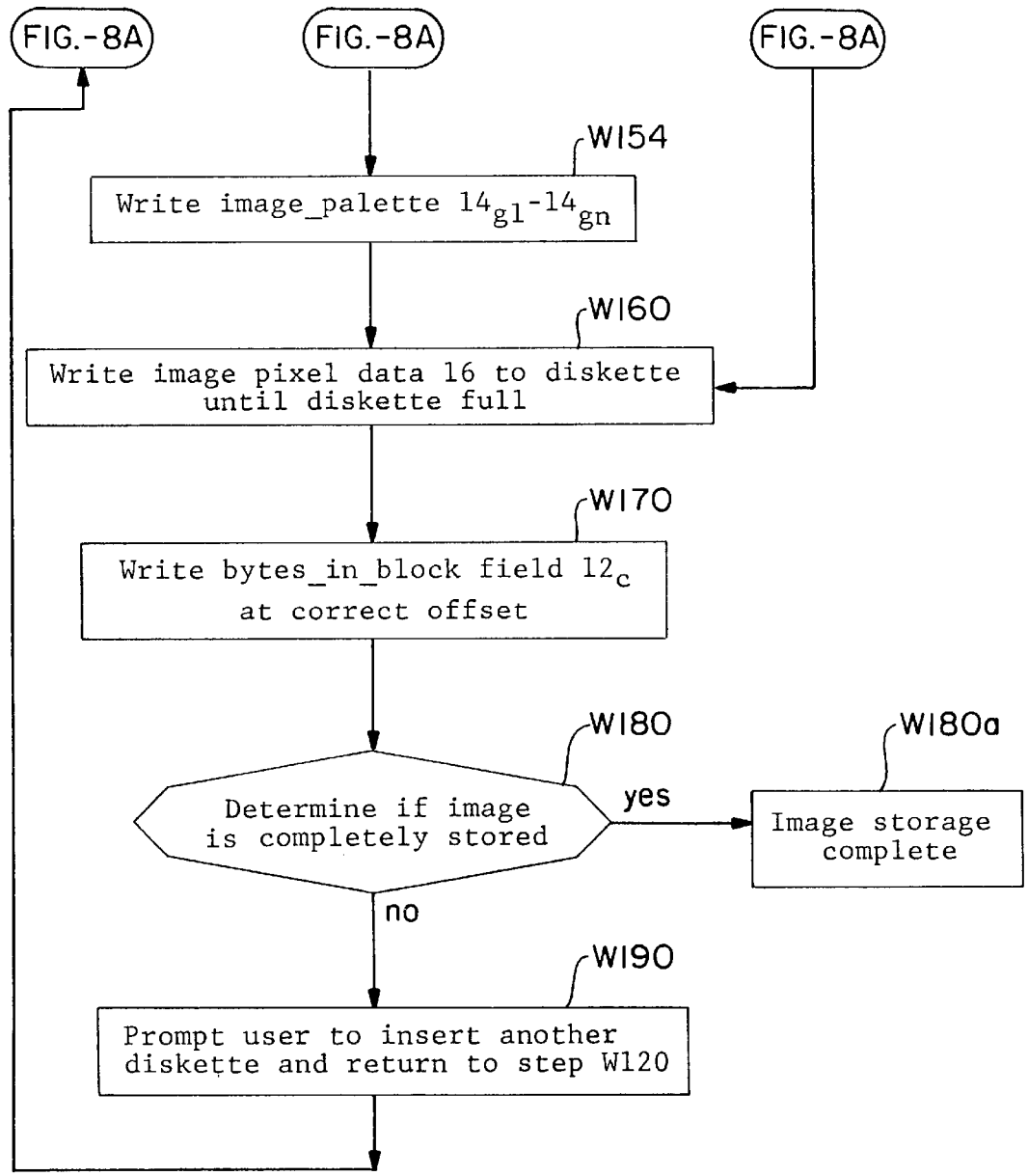

A method of storing the image data to one or more diskettes or other media such that the diskettes can be read "out-of-order" is set forth in FIG. 8, wherein the steps corresponding to steps discussed in relation to FIGS. 1A through 5 have been numbered 100 greater than the steps to which they correspond. Specifically, once a computer user inserts a diskette into a disk drive of the computer on which an image is being viewed, step W120 is performed to determine if the diskette contains the required minimum available space. Step W120 is carried out through substep W121, "Determine the bytes available on the diskette" and substep W122, "Compare bytes available on diskette to a predetermined minimum required space to determine if sufficient space is available on diskette" in a manner similar to that discussed above in relation to FIG. 5.

If the minimum amount of space is not available, step W120a is performed to "Prompt user that insufficient space available on diskette." Otherwise, step W130 is performed to store the image block data 12' through substep W131.1 "Write magic_number 12a", substep W131.2 "Write total_image_size 12e", substep W131.3 "Write current offset 12f relative to beginning of image data file", and substep W132 "Record offset of bytes_in_block field 12c." Step W132 is performed such that the value of bytes_in_block field 12b can be later filled-in when the amount of image pixel data 16 stored on the disk is known.

Step W140 is next performed to "Determine if current diskette is the first to which data will be written." If so, the image information 14 must also be written to the disk through step W150 including substeps W151–W154. Once step W150 has been performed, or if the diskette is not the first used to store the current image, step W160, "Write image_pixel_data 16 until diskette full" is performed. As discussed above, the amount of image pixel data 16 written to the current diskette is monitored such that step W170 "Write the bytes_in_block 12c at correct offset" can be performed when the disk is full (or when the image has been completely stored).

Step W180 is then performed to "Determine if the image has been completely stored." If so, then the storing process is complete with step W180a, and if not, step W190 is performed to "Prompt the user to insert another diskette and return to step W120."

The foregoing provides a method for storing image data to multiple diskettes or another media and a method for retrieving the data thus stored, wherein the diskettes may be read in any order desired. As was mentioned previously, the method of the present invention can be utilized with any type of storage medium, and any combination thereof. Therefore, while the method has been described with particular reference to the use of diskettes, the method may be practiced with hard or "fixed" disk drives, magnetic tapes, CD-ROM's, and any other suitable storage media or a combination of the foregoing. It can be seen that when a computer operator has a computer image displayed on a computer, or otherwise stored within a computer, the present invention allows the operator to store the image to one or more diskettes or other storage media and allows a computer user to thereafter retrieve the image thus stored from the variety of storage media utilized. Again, those skilled in the art will recognize that a wide variety of data compression techniques may be utilized in conjunction with the foregoing method of the present invention, and it is preferable that a data compression technique such as Run Length Encoding (RLE), LZ compression, or any other suitable compression technique be so utilized, and also that a wide variety of error checking operations may be performed in conjunction with the foregoing method to ensure that the image data is accurately stored to the storage media, and accurately retrieved therefrom. Furthermore, numerous other modifications can be made to the foregoing method. The information written to the image block data 12,12', and the image information 14 may be varied as desired without departing from the method of the present invention. For example, printer information fields may be added to the primary block data structure 10,110 or the secondary block data structure 10',110' to facilitate the printing of a retrieved image. Any of a wide variety of color palettes, grey scales, data compression techniques, error checking techniques, and the like may be utilized in conjunction with the present invention. Further, a "location of next data block" field may be provided as a part of primary data block 10,110 or secondary data block 10',110' to point to the location (e.g., a directory or a device) of the next block of image pixel data 16. A variety of additional verification fields may be provided— e.g., a date and/or time stamp field may be provided to verify or distinguish between files that may have the same name. In general, those skilled in the art will recognize that the foregoing description has set forth the preferred embodiments of the invention in particular detail and it must be understood that numerous modifications, substitutions and changes can be undertaken without departing from the true spirit and scope of the present invention as defined by the ensuing claims.

What is claimed is:

1. A method of storing digital image data from a single image to at least two separate pieces of storage media, wherein said single image is partially stored on each piece of storage media utilized, said method comprising the steps of:

writing a block number value to a first piece of storage media to reference said first piece of storage media as the first of at least two separate pieces of storage media;

writing image information to said first piece of storage media, said image information including at least information regarding the size of said image to be stored;

writing image pixel data to said first piece of storage media;

writing a bytes in block value to said first piece of storage media to indicate the amount of image pixel data stored on said first piece of storage media;

writing a bytes left value to said first piece of storage media to indicate the amount of image pixel data to be stored on at least a second piece of storage media;

writing a block number value to said at least second piece of storage media to reference the sequential order of said at least second piece of storage media relative to said first piece of storage media;

writing image pixel data to said at least second piece of storage media;

writing a bytes in block value to said at least second piece of storage media to indicate the amount of image pixel data stored on said at least second piece of storage media;

writing a bytes left value to said at least second piece of storage media to indicate the amount of image pixel data to be stored on additional separate pieces of storage media, whereby image data thus stored on at least two pieces of storage media is retrieved by sequentially reading said first and at least second pieces of storage media.

2. A method as recited in claim 1, wherein said bytes left value stored to said at least second piece of storage media equals zero when all of said image data of said image has been stored to said first and said at least second piece of storage media.

3. A method as recited in claim 1, wherein said step of writing image information to said first piece of storage media includes the step of writing an image height value and an image width value.

4. A method as recited in claim 3, wherein said image height and image width values are expressed in terms of pixels.

5. A method as recited in claim 1, wherein said step of writing image pixel data to said first piece of storage media is carried out by utilizing all available space on said first piece of storage media.

6. A method as recited in claim 1, further comprising the steps of:

determining the available space on said first piece of storage media prior to writing data to said first piece of storage media to verify that at least a predetermined amount of free storage space is available on said first piece of storage media;

determining the available space on said at least second piece of storage media prior to writing data to said at least second piece of storage media to verify that at least a predetermined amount of free storage space is available on said at least second piece of storage media.

7. A method as recited in claim 1, further comprising the step of writing a predetermined magic number value to said at least two pieces of storage media to subsequently identify said at least two pieces of storage media.

8. A method as recited in claim 1, wherein said step of writing image information to said first piece of storage media includes the step of writing an image color palette to said first piece of storage media.

9. A method as recited in claim 8, wherein said step of writing image information to said first piece of storage media includes the step of writing an image colors value to said first piece of storage media to reference the size of said image color palette.

10. A method as recited in claim 9, wherein said image color palette includes at least 2 different RGB values.

11. A method of storing a single digital image data file to at least two separate pieces of storage media, wherein said single image is partially stored on each piece of storage media utilized, said method comprising the steps of:

writing a total image size value to a first piece of storage media to indicate the total size of said digital image data file to be stored on said at least two separate pieces of storage media;

writing a current offset value to said first piece of storage media to indicate the offset, relative to the beginning of said single digital image, of the image data to be stored on said first piece of storage media;

writing image information to said first piece of storage media, said image information including at least image size information;

writing image pixel data to said first piece of storage media;

writing a bytes in block value to said first piece of storage media to indicate the amount of image pixel data written to said first piece of storage media;

writing a total image size value to at least a second piece of storage media to indicate the total size of said digital image data file to be stored on said at least two separate pieces of storage media;

writing a current offset value to said at least second piece of storage media to indicate the offset, relative to the beginning of said single digital image, of the image data to be stored on said at least second piece of storage media;

writing image information to said at least second piece of storage media, said image information including at least image size information;

writing image pixel data to said at least second piece of storage media;

writing a bytes in block value to said at least second piece of storage media to indicate the amount of image pixel data written to said at least second piece of storage media;

whereby image data thus stored on at least two separate pieces of storage media is retrieved by reading said at least two separate pieces of storage media in any order.

12. A method as recited in claim 11, wherein said step of writing image information to said first piece of storage media includes the step of writing an image height value and image width value.

13. A method as recited in claim 12, wherein said image height and width values are expressed in terms of pixels.

14. A method as recited in claim 11, wherein said step of writing image pixel data to said first piece of storage media is carried out by utilizing all available space on said first piece of storage media.

15. A method as recited in claim 11, further comprising the steps of:

determining the available space on said first piece of storage media prior to writing data to said first piece of storage media to verify that at least a predetermined amount of free storage space is available on said first piece of storage media;

determining the available space on said at least second piece of storage media prior to writing data to said at least second piece of storage media to verify that at least a predetermined amount of free storage space is available on said at least second piece of storage media.

16. A method as recited in claim 11, further comprising the step of writing a predetermined magic number value to said at least two pieces of storage media for subsequent identification of said at least two pieces of storage media.

17. A method as recited in claim 11, wherein said step of writing image information to said first piece of storage media includes the step of writing an image color palette to said first piece of storage media.

18. A method as recited in claim 17, wherein said step of writing image information to said first piece of storage media further includes the step of writing an image colors value to said first piece of storage media to reference the size of said image color palette.

19. A method as recited in claim 18, wherein said image color palette includes at least 2 different RGB values.

20. A method as recited in claim 11, wherein said step of writing a bytes in block value to said first piece of storage media is carried out by:

identifying the offset of a bytes in block field on said first piece of storage media;

writing the amount of image pixel data stored on said first piece of storage media in said bytes in block field subsequent to the step of writing image pixel data to said first piece of storage media.

21. A method as recited in claim 20, wherein said step of writing a bytes in block value to said at least second piece of storage media is carried out by:

identifying the offset of a bytes in block field on said at least second piece of storage media;

writing the amount of image pixel data stored on said at least second piece of storage media in said bytes in block field subsequent to the step of writing image pixel data to said at least second piece of storage media.

22. A method of retrieving digital image data for a single image from at least two separate pieces of storage media, wherein said single image is partially stored on each piece of storage media utilized, said method comprising the steps of:

reading a block number value from a piece of storage media to verify that said piece of storage media is the first piece of storage media;

reading image information from said first piece of storage media, said image information including at least information regarding the size of said image to be retrieved;

reading a bytes in block value from said first piece of storage media to indicate the amount of image pixel data stored on said first piece of storage media;

reading a bytes left value from said first piece of storage media to indicate the amount of image pixel data to be retrieved from at least a second piece of storage media;

reading image pixel data from said first piece of storage media;

reading a block number value from said at least second piece of storage media to verify that said piece of storage media is the next sequential piece of storage media;

reading a bytes in block value from said at least second piece of storage media to indicate the amount of image pixel data stored on said at least second piece of storage media;

reading a bytes left value from said at least second piece of storage media to indicate the amount of image pixel data to be retrieved from additional separate pieces of storage media;

reading image pixel data from said at least second piece of storage media; and repeating the foregoing steps until said digital image data from said single image has been completely retrieved.

23. A method as recited in claim 22, wherein said step of reading image information from said first piece of storage media includes the step of reading an image height value and an image width value.

24. A method as recited in claim 23, wherein said image height and width values are expressed in terms of pixels.

25. A method as recited in claim 22, wherein said step of reading image information from said first piece of storage media includes the step of reading an image color palette from said first piece of storage media.

26. A method as recited in claim 25, wherein said step of reading image information from said first piece of storage media includes the step of reading an image colors value from said first piece of storage media to reference the size of said image color palette.

27. A method of retrieving digital image data for a single image from at least two separate pieces of storage media, wherein said single image is partially stored on each piece of storage media utilized, said method comprising the steps of:

reading a total image size value from a first piece of storage media to determine the total size of said digital image data file to be retrieved from said at least two separate pieces of storage media;

reading a current offset value from said first piece of storage media to determine the offset, relative to the beginning of said single digital image, of the image data to be retrieved from said first piece of storage media;

reading a bytes in block value from said first piece of storage media to determine the amount of image pixel data written to said first piece of storage media;

reading image information from said first piece of storage media, said image information including at least image size information;

reading image pixel data from said first piece of storage media;

reading a current offset value from said at least second piece of storage media to determine the offset, relative to the beginning of said single digital image, of the image data to be retrieved from said at least second piece of storage media;

reading a bytes in block value from said at least second piece of storage media to determine the amount of image pixel data written to said at least second piece of storage media;

reading image information from said at least second piece of storage media, said image information including at least image size information;

reading image pixel data from said at least second piece of storage media;

repeating the foregoing steps until said digital image data from said single image has been completely retrieved.

28. A method as recited in claim 27, wherein said step of reading image information from said first piece of storage media includes the step of reading an image height value and image width value.

29. A method as recited in claim 28, wherein said image height and width values are expressed in terms of pixels.

30. A method as recited in claim 27, further comprising the step of reading a predetermined magic number value from said at least two pieces of storage media to identify said at least two pieces of storage media.

31. A method as recited in claim 27, wherein said step of reading image information from said first piece of storage media includes the step of reading an image color palette from said first piece of storage media.

32. A method as recited in claim 31, wherein said step of reading image information from said first piece of storage media further includes the step of reading an image colors value from said first piece of storage media to determine the size of said image color palette.

* * * * *